March 17, 1931. H. C. LEHN 1,796,716
GAS ENGINE
Filed Nov. 12, 1927 4 Sheets-Sheet 1
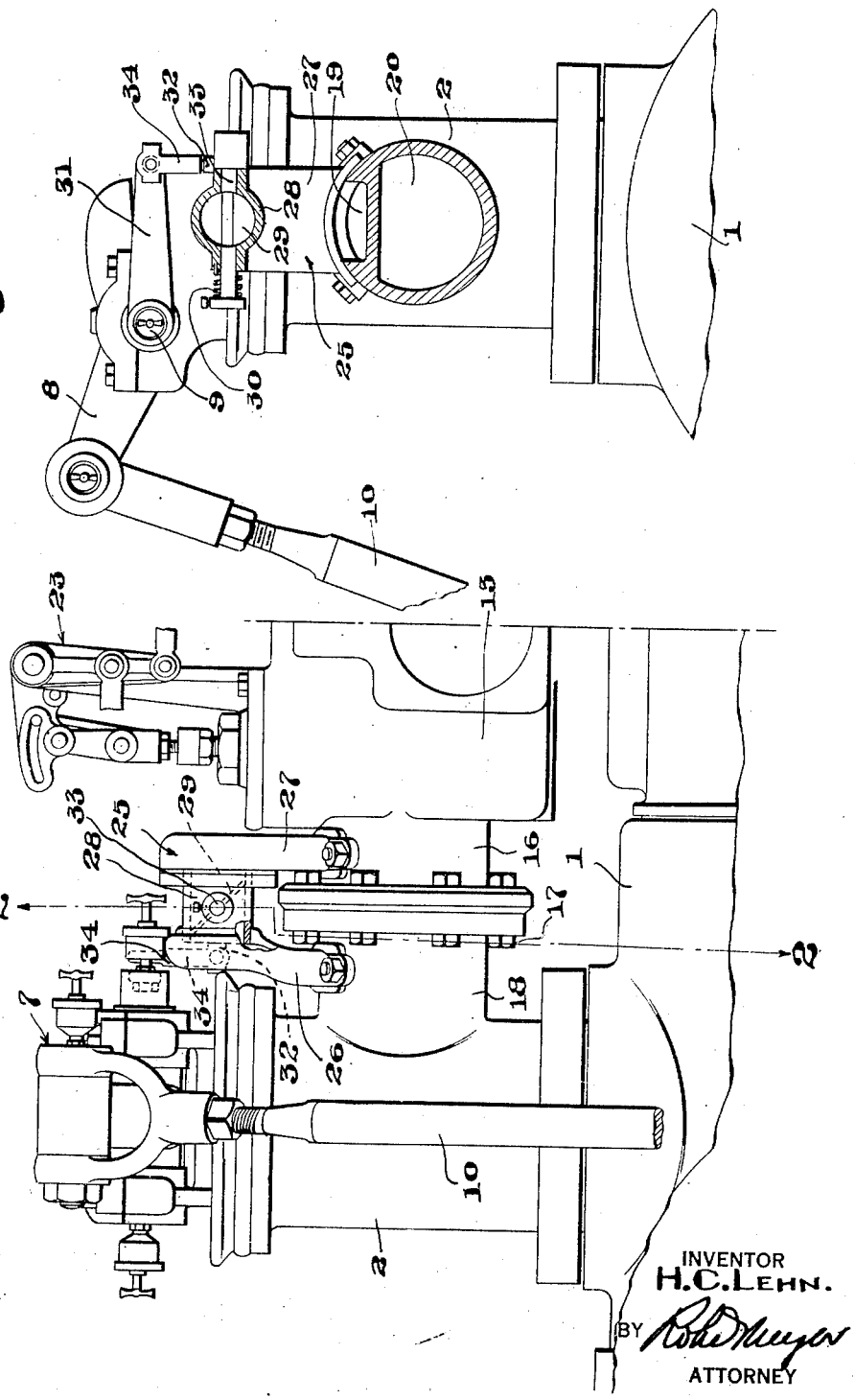
INVENTOR
H.C.LEHN.
BY
ATTORNEY

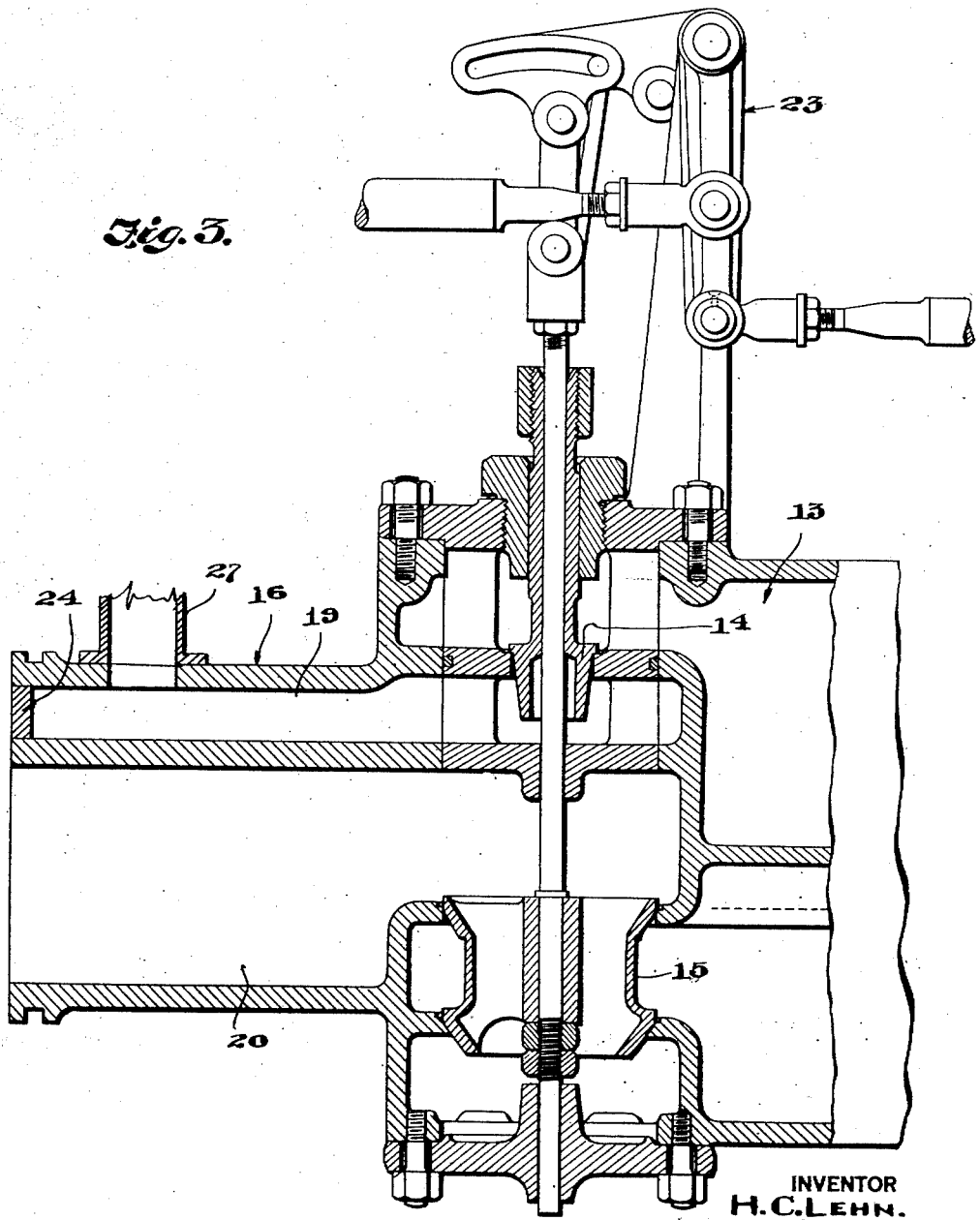

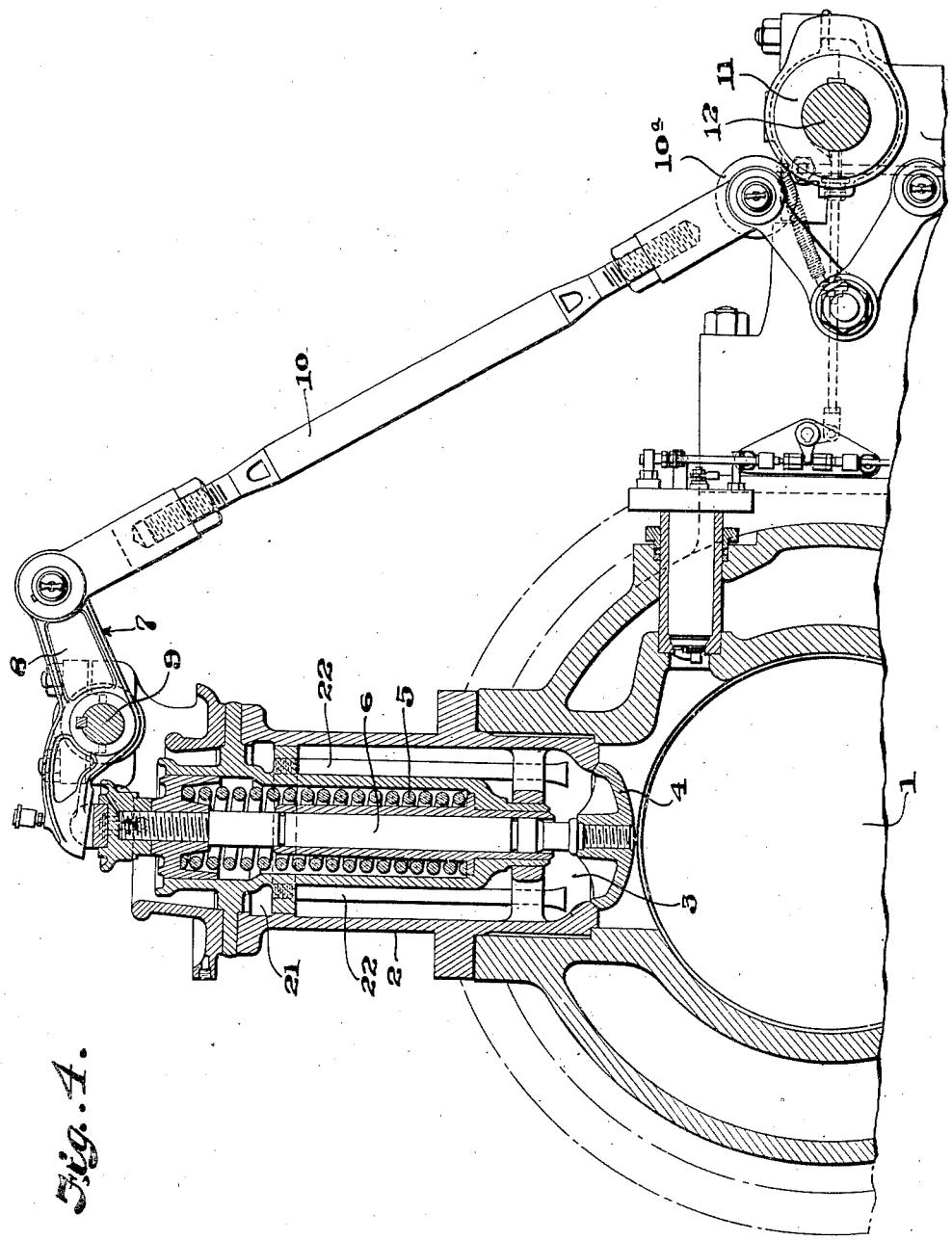

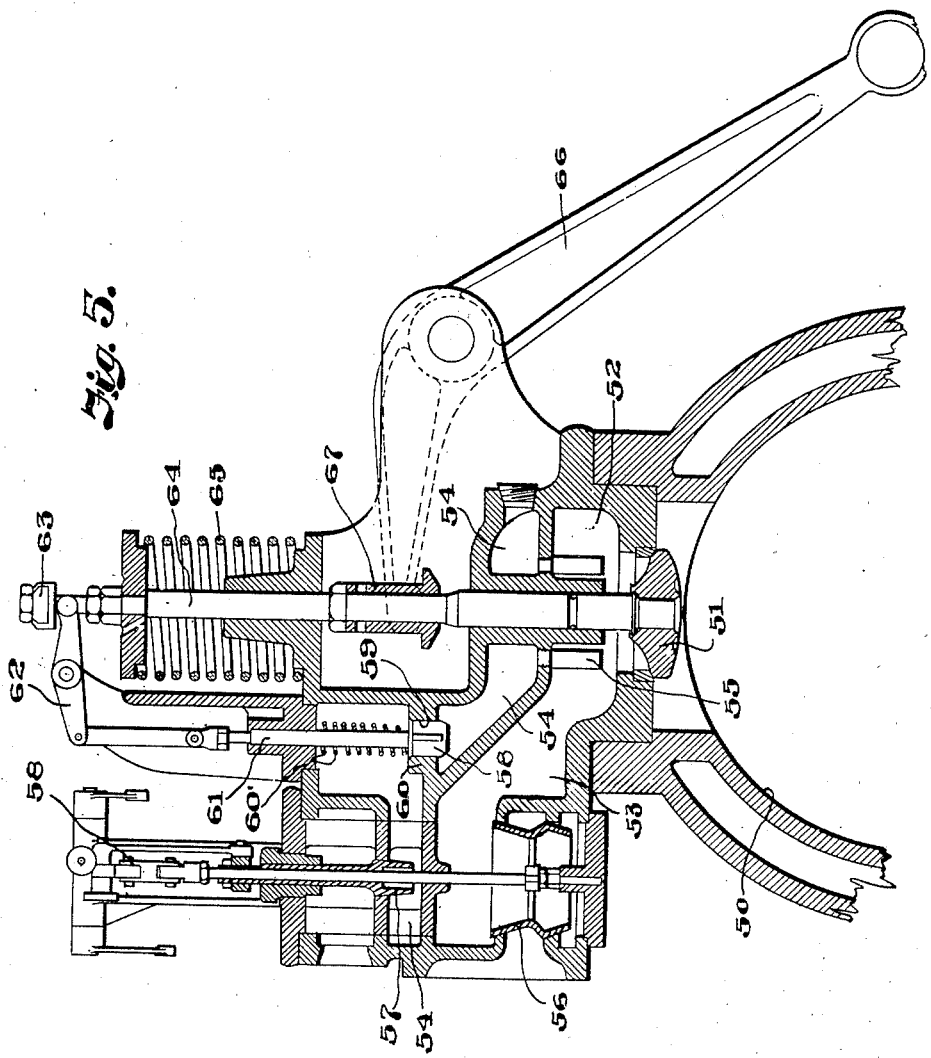

Patented Mar. 17, 1931

1,796,716

UNITED STATES PATENT OFFICE

HENRY C. LEHN, OF BUFFALO, NEW YORK, ASSIGNOR TO WORTHINGTON PUMP AND MACHINERY CORPORATION, OF NEW YORK, N. Y., A CORPORATION OF VIRGINIA

GAS ENGINE

Application filed November 12, 1927. Serial No. 232,727.

This invention relates to new and useful improvements in gas engines of that type which burns natural gas as a fuel.

Heretofore engines of this type have been provided with the usual cylinder, main or mixture inlet valve for controlling the passage of the mixed gas and air into the cylinder of the engine gas and air supply valves which are governor controlled for regulating the supply of air and gas to the mixing chamber in proportion to the load. Owing to the respective natures of the gas and air the gas has a tendency to flow more freely into the mixing chamber, when the main or mixture inlet valve is closed, resulting in a mixture richer in gas than is desired or proper for most efficient operation of the engine.

The principal object of my invention is to provide means for preventing an excess amount of gas entering the mixing chamber when the mixture inlet valve is closed, whereby the proper amount of gas and air will be provided in the mixing chamber and admitted to the cylinder of the engine so as to ensure efficient operation of the engine.

The invention comprehends a valved bypass, for the gas, located intermediate the mixture or main inlet valve and the gas supply valve, and operating means for the bypass valve connected to the operating means for the main inlet valve whereby both the by-pass valve and the main inlet valve will be opened and closed in unison.

With these and other objects in view which will more fully appear, the nature of the invention will be more clearly understood by following the description, the appended claims, and the several views illustrated in the accompanying drawings.

In the accompanying drawings which illustrate one form of my invention:

Figure 1 is a fragmentary elevation of a portion of a gas engine constructed in accordance with my invention, Figure 2 is a sectional view taken on the line 2—2 of Fig. 1, Figure 3 is an enlarged sectional view showing the main gas and air controlling valves, and operating mechanism therefor, and Figure 4 is an enlarged sectional view through the cylinder of the engine, the mixing chamber, the inlet valve, and the operating mechanism for said valve.

Figure 5 is a sectional view showing a modified form of the invention.

Reference numerals designate corresponding parts throughout the several figures of the drawings.

Referring particularly to the accompanying drawings, the present engine construction to which I have applied my invention includes a cylinder 1, a housing 2 containing a mixing chamber 3, and a main fuel inlet valve 4 for admitting the fuel mixture into the cylinder 1 from the mixing chamber. The inlet valve 4 is normally held closed by a spring 5 which surrounds the stem 6, and the valve is opened against the spring by the valve operating mechanism which is indicated as a whole by the numeral 7. The valve operating mechanism includes a rocker arm 8 which is fixed intermediate its ends to a shaft 9 journaled in the housing 2. One end of the rocker arm 8 cooperates with the upper end of the stem 6 to open the inlet valve, and the other end is connected to the valve rod 10 having a cam roller 10a which is actuated by a single nose cam 11 on the cam shaft 12. A valve casing 13 which contains a gas supply valve 14 and an air supply valve 15 is provided with a lateral extension 16 which is bolted as at 17 to a similar lateral extension 18 on the housing 2. The extensions 16 and 18 are conjointly provided with a gas passage 19 and an air passage 20, the former communicating with the gas supply valve 14 and with the gas chamber 21 located within the housing 2 and communicating with the mixing chamber 3 through pipes 22, and the latter communicating with the air supply valve 15 and the mixing chamber 3. The gas and air valves 14 and 15 are opened and closed simultaneously under governor control through the mechanism which is indicated by the numeral 23, to proportion the gas and air inlet in accordance with the load of the engine. Thus, in the operation of the engine as thus described and without the application of my invention, gas is directed from the main supply valve 14, through the gas passage 19, which is formed in the lateral extensions 16 and 18, to the gas chamber 21 at the upper end of the housing 2, and thence through the pipes 22 to the mixing chamber 3. Air is directed from the air supply valve 15 through the air passage 20 to the mixing chamber 3. The mixed fuel is then admitted to the cylinder 1 upon opening of the mixture inlet valve 4. Thus, when the main or mixture inlet valve 4 is closed the gas supply valve 14 and the air supply valve 15 are open, the gas will flow freely to the mixing chamber and a richer fuel mixture is formed in the lower portion of the mixing chamber than should be received in said chamber to insure efficient operation of the engine.

The present invention overcomes these objections by providing a control valve in the gas passage intermediate the mixture inlet valve 4 and the gas supply valve 14, and a control valve actuating mechanism which is timed to open and close in unison with the mixing inlet valve 4, whereby a mixture of proper proportions, and the resultant efficient operation of the engine, will be ensured.

In the form of the invention shown in Figs. 1 to 4 of the drawings the gas passage 19 of the lateral extension 16 is closed by a plug 24, a by-pass 25 is attached to the extensions 16 and 18 in a manner to communicate with the gas passage 19 on opposite sides of the plug 24. This by-pass includes spaced pipes 26 and 27 which respectively communicate with gas passage 19 on opposite sides of the plug 24, and a connecting valve chest 28 which communicates with said pipes. A valve 29 preferably of the butterfly type is journaled within the valve chest 28 of the by-pass and is normally held in its closed position by a spring 30. This by-pass valve 29 is actuated from the cam 11, which actuates the mixture inlet valve 4, through the medium of a lever 31 fixed to the shaft 9, an arm 32 fixed to the stem 33 of the by-pass valve 29, and a link 34 which is pivoted to the lever 31 and arm 32.

Thus when the cam 11 is actuated to open the mixture inlet valve 4 against the tension of the spring 5, the by-pass valve 29 is simultaneously opened against the tension of the spring 30. After the nose of the cam 11 is moved from active engagement with the roller 10a, the valves 4 and 29 will be automatically returned to their closed positions by their respective springs 5 and 30. Thus the inlet valve 4 and the by-pass valve 29 are opened and closed in unison.

When the engine is operating and the by-pass valve 29 as well as the mixture inlet valve 4 are closed, the passage 19 in the lateral extension 16 will become filled with gas and this gas will be prevented from flowing into the mixing chamber 3 until the fuel inlet valve 4 and the by-pass valve 29 have been opened, when the engine suction will draw the gas past the by-pass valve 29 thence through the passage 19 of the lateral extension 18, thence into the chamber 21, and thence through the pipe 22 to the mixing chamber 3 where said gas is mixed with the air admitted through the valve 15, thereby providing the proper proportions of gas and air in the mixing chamber and engine cylinder.

In the structure illustrated in Figs. 1 to 4 of the drawings and above described, the invention is shown as particularly adapted for attachment to existing engines, while in Fig. 5 of the drawings, a construction is shown wherein the control valve is built in the engine structure.

Reverting to Fig. 5 of the drawings, the cylinder 50 of the engine has a mixture inlet valve 51 associated therewith which controls the inlet of the combustible mixture or fuel into the cylinder 50 and it corresponds to the mixture inlet valve 4. The fuel mixture passes into the cylinder 50, past the valve 51 when the latter is open, from the mixing chamber 52 and air is admitted to the mixing chamber 52 through the air passage 53 while gas is admitted to the mixing chamber 52 through the gas passage 54 and the tubes 55. The tubes 55 correspond to the tubes 22 and the gas passage 54 corresponds to the gas passage 19 in the form of invention shown in Figs. 1 to 4 inclusive.

The air and gas are admitted to the passages 53 and 54 from suitable sources by the air and gas supply valves 56 and 57 respectively. The valves 56 and 57 correspond to the valves 14 and 15 and are mounted for operation in unison, being operated by the governor controlled mechanism indicated at 58. The mechanism 58, the same as the mechanism 23, is controlled by a governor (not shown) so as to control the valves 56 and 57 in proportion to the load under which the engine is operating. To prevent an excess proportionate quantity of gas from flowing into the mixing chamber 52 and resulting in a richer mixture being admitted to the cylinder 50, than is desired, a control valve 58 is provided which controls an opening 59 formed in the partition 60 which spans the gas passage 54. The valve 58 is held closed by a spring 60 and its valve stem 61 has a rocker arm 62 connected thereon which engages a head 63 on the valve stem 64 and the mixture inlet valve 51. The mixture inlet valve 51 is held closed by the spring 65 and it is opened by operation of the lever 66 through the medium of a nut 67 mounted on the valve stem 64. The lever 67 is operated by a mechanism such as the mechanism illustrated and described for operating the link 10 and lever 8.

When the valve 51 is moved inwardly or open by operation of the lever 66, the valve rod 64 will be moved inwardly which will move the valve stem 61 and the valve 58 outwardly, and open the port or opening 59 to permit gas to be drawn from that portion of the gas passage 54 outwardly of the partition 60 from the mixing chamber, thereby permitting gas to be drawn into the mixing chamber by the suction of the engine. When the valve 51 is closed upon release of pressure on the nut 67, by the arm 66, the spring 60 will close the valve 58 and prevent gas from flowing into the mixing chamber and consequently preventing an excess amount of gas in proportion to the air from accumulating in the mixing chamber and being drawn into the cylinder 50 when the valve 51 is next opened.

The function of the modified form is identical with the function of the form shown in Figs. 1 to 4 of the drawings and differs therefrom in that the by-pass 25 is replaced by the dividing partition 60, providing a compact arrangement which can be built into the engine upon its construction.

It is to be understood that the invention is not to be limited to the specific construction or arrangement of parts shown but that these may be modified widely within the invention defined by the claims.

What is claimed is:

1. In a gas engine, a mixture inlet valve, a mixing chamber, air and gas supply valves, a control valve between said gas inlet valve and mixing chamber, and means for opening said control-valve subsequent to the opening of said air and gas supply valves whereby air will be admitted to said mixing chamber prior to the admittance of gas thereinto.

2. In a gas engine, a mixture inlet valve, a mixing chamber, air and gas supply valves movable in unison, and means between the gas supply valve and mixing chamber to arrest the passage of gas to the mixing chamber whereby air will be admitted to the mixing chamber prior to the admittance of gas thereto, said gas passage arresting means operable in unison with the opening of said mixture inlet valve to permit passage of gas into the mixing chamber, and tubes extending into said mixing chamber for directing gas entering the chamber to points adjacent to the mixture outlet of the mixing chamber.

3. In a gas engine, a mixture inlet valve, a mixing chamber, air and gas supply valves movable in unison, a control valve between said gas inlet valve and mixing chamber for arresting the passage of gas to the mixing chamber whereby air will be admitted to the chamber prior to the admittance of gas thereto, and tubes extending into said mixing chamber for directing gas entering the chamber to points adjacent the mixture outlet of the mixing chamber.

4. In a gas engine, a mixture inlet valve, a mixing chamber, air and gas supply valves moveable in unison, an air and a gas passage leading to the mixing chamber, a control valve in the gas passage for arresting passage of gas to the mixing chamber whereby air will be admitted to the mixing chamber prior to the admittance of gas thereto, means for opening the mixture inlet valve, and means operated by the opening of the mixture inlet valve for opening said gas control valve, and tubes extending into said mixing chamber for directing gas entering the chamber to points adjacent the mixture outlet of the mixing chamber.

5. In a gas engine, a mixture inlet valve, a mixing chamber, air and gas supply valves movable in unison, means for retarding the inlet of gas into said mixing chamber after the opening of said air and gas valves and prior to the opening of said mixture inlet valve, and means extending into said mixing chamber for directing gas entering the mixing chamber to points adjacent to the mixture outlet of the chamber.

6. In a gas engine, a mixing chamber, air and gas supply valves, a mixture inlet valve, means for opening said air and gas supply valves prior to the opening of said mixture inlet valve, a control valve between said gas supply valve and mixing chamber for retarding the inlet of gas into said mixing chamber after the opening of the gas supply valve, a rocker arm for opening said control valve, and means operated upon opening movement of said mixture inlet valve for operating said rocker arm to open said control valve.

7. In a gas engine, a mixing chamber, air and gas supply valves, a mixture inlet valve, means for opening said air and gas supply valves prior to the opening of said mixture inlet valve, a control valve between said gas supply valve and mixing chamber for retarding the inlet of gas into said mixing chamber after the opening of the gas supply valve, a rocker arm for opening said control valve, and means operated upon opening movement of said mixture inlet valve for operating said rocker arm to open said control valve, and a spring for closing said control valve.

In testimony whereof I affix my signature.

HENRY C. LEHN.